United States Patent [19]

Smith

[11] 3,758,179
[45] Sept. 11, 1973

[54] MECHANICAL SHAFT SEAL
[75] Inventor: Basil G. Smith, Kentville, Nova Scotia, Canada
[73] Assignee: Basil Smith Seals Limited, Kentville, Nova Scotia, Canada
[22] Filed: Dec. 14, 1971
[21] Appl. No.: 207,935

[30] Foreign Application Priority Data
Sept. 24, 1971 Canada.............................. 123627

[52] U.S. Cl.................. 308/187.1, 277/41, 277/85, 277/93 R, 308/36.2
[51] Int. Cl. ............................................ F16c 33/76
[58] Field of Search...................... 308/187.1, 187.2, 308/36.1, 36.2; 277/40, 41, 85, 93 R

[56] References Cited
UNITED STATES PATENTS
3,198,529  8/1965   Voitik............................... 277/93 R
3,072,414  1/1963   Porges.............................. 277/93 R
3,157,404  11/1964  Doble............................... 277/93 R
2,701,154  2/1955   Dolhun............................. 308/187.1
2,826,465  3/1958   Gordon............................ 308/187.1
2,393,260  1/1946   Pardee............................. 308/187.1
3,227,463  1/1966   Wiese................................ 277/93 R Primary Examiner—Charles J. Myhre
Assistant Examiner—Barry Grossman
Attorney—Richard K. Stevens et al.

[57] ABSTRACT

An externally mounted axial mechanical shaft seal includes a housing having a rotor adapted to sealingly engage a shaft mounted therein. A rotating seal ring mounted on said rotor is biased by a Belleville spring washer towards a stationary seal ring on said housing. A thrust bearing disposed between a portion of the rotor and the housing prevents the rotor from moving away from the stationary seal ring, maintains alignment of the seal rings and absorbs axial shock loads. As wear of the seal rings takes place, adjustment screws are tightened against the thrust bearing to move the rotor toward the stationary seal ring to compress the Belleville spring washer to the required degree.

17 Claims, 7 Drawing Figures

MECHANICAL SHAFT SEAL

BACKGROUND OF THE INVENTION

This invention relates to self-contained fluid seals, particularly to devices for providing a fluid tight seal between two relatively rotatable machine parts.

As those skilled in this art will appreciate, the provision and maintenance of substantially leak-proof seals between moving machine parts is a complicated and difficult task. Over the past many years, hundreds of different seal designs have evolved, each having for its object the elimination of a particular problem encountered. Needless to say, many of these designs did not live up to expectations while others have since become obsolete. With the increasing emphasis being placed on pollution control devices the past several years, additional pressures have been placed on the designers and manufacturers of fluid seals to provide improvements in their products since the rapid wear and leakage of noxious materials permitted by many of the sealing devices provided by the prior art definitely contributes to the quantity of pollutants escaping into the environment. This is particularly true in the cases of the chemical industries and the pulp and paper industries.

THE INVENTION

The present invention has as its main object the provision of an improved mechanical shaft seal to provide a fluid tight seal between relatively rotating machine parts, said seal requiring a minimum amount of maintenance and being effective in maintaining a fluid tight seal under adverse operating conditions.

A further object is to provide a mechanical shaft seal including a housing means within which is mounted a rotor, the latter adapted to sealingly engage a rotatable shaft and wherein thrust bearing means are provided between the housing and the rotor to maintain alignment of the seal faces within the housing, absorb shock loads transmitted along the shaft and to help initiate and maintain pressure on the sealing faces which act to prevent fluid leakage between the rotor and the housing.

A more specific object is to provide an axial mechanical seal having a floating rotary seal ring mounted to a rotor in such a way as to greatly improve the resistance of the axial seal, especially the seal faces, to damage resulting from shaft end play and shock loads applied to the shaft.

A further object is to provide means to enable ready readjustment of the loading on the seal faces after a certain amount of wear of same has taken place without the need for dismantling the seal assembly.

A further object is to provide a mechanical seal which is completely self-contained and adapted to be externally mounted on a machine casing thus making repairs to said seal or replacement thereof extremely easy to effect and reducing machine down time.

A further object of the invention is to provide a mechanical shaft seal which is suitable for use with a wide range of shaft diameters; this reduces the number of different basic seal sizes that have to be produced and stocked thus reducing costs for both the manufacturer and the customer.

BRIEF REFERENCES TO THE DRAWINGS

The various features of the invention will become more apparent from a reading of the following description of an embodiment of the invention wherein reference is made to drawings wherein.

DETAILED DESCRIPTION

Figure 1:
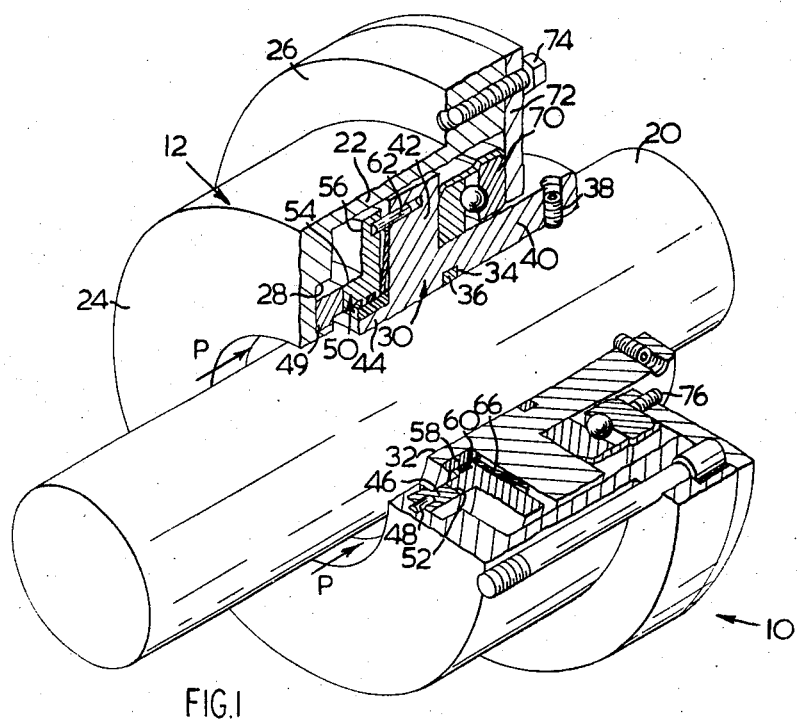
FIG. 1 is a perspective view of a seal assembly according to the invention, portions of same being cut away to show the internal structure.
Figure 2:
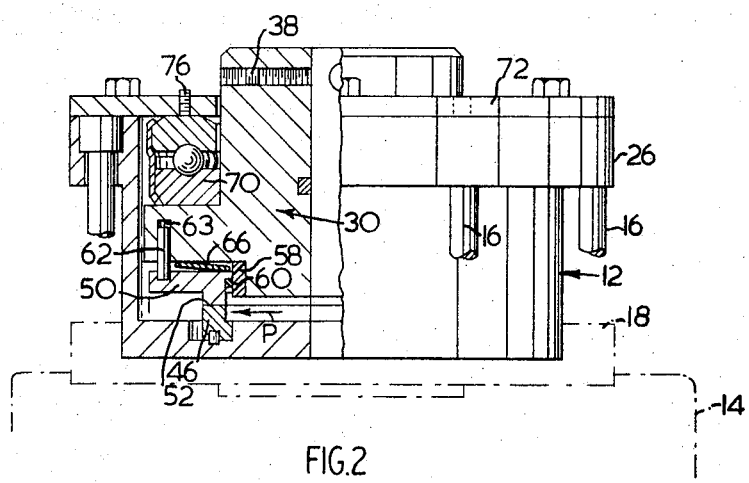
FIG. 2 is a cross sectional view of the seal assembly according to the present invention.
Figure 4:
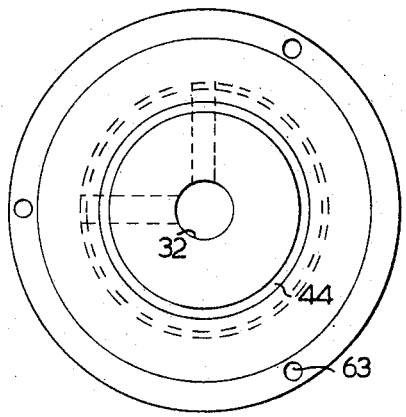
FIGS. 3 and 4 are side and end elevation views of the seal rotor.

Referring to the drawings especially FIGS. 1 and 2, there is seen a seal assembly 10 including a metal housing 12 adapted to be sealingly mounted externally on a machine casing, for example, a pump casing, (shown by dashed lines in FIG. 2 and identified by the reference numeral 14) via mounting screws 16. An adapted plate 18 (shown by dashed lines in FIG. 2) is disposed between the machine casing and the seal housing 12. The adapter plate will have a configuration which varies depending on the shape or nature of the machine casing to which it is applied whereby to enable the seal assembly 10 to be mounted on many different types of machinery. Extending along the axis of symmetry of the seal assembly is a rotatable shaft 20, for example, a pump impeller shaft. The function of the seal assembly is to prevent escape of high pressure liquids P from the interior of casing 14 along or around the shaft 20.

Housing 12 includes a generally cup-shaped portion having a cylindrical side wall portion 22 and an end wall 24 integrally connected at the end of the housing which is exposed to pressurized liquids, and an annular shoulder 26 formed at the other end of the cylindrical side wall 22. Shoulder 26 has a plurality of circumferentially spaced apertures therein which accommodate the mounting screws 16 with shoulder 26 being drawn tightly against the adapter plate 18 by screws 16 when the seal assembly is mounted on a machine casing. End wall 24 has a centrally disposed aperture therein whereby to permit shaft 20 to pass therethrough. That surface of end wall 24 which faces inwardly of the seal is provided with an annular groove 28 which serves to support a stationary seal element to which reference will be made hereinafter. The housing 12 is made of a suitable corrosion resistant metal, NI RESIST (Reg. TM.), a nickel cast iron alloy, being very suitable for use here. The housing also includes an end plate 72 secured to the outer face of shoulder 26 by fasteners 74.

Disposed within the enclosure defined by the housing 12 are the various seal components. These include an annular rotor 30. Rotor 30 has a bore 32 extending axially therethrough sized to accommodate the shaft 20. The surface of said bore is provided with an annular groove 34 accommodating a rubber sealing ring 36 which prevents leakages of fluids between rotor 30 and shaft 20. A plurality of set screws 38 extending radially through the rotor adjacent the outer end thereof serve to secure the rotor to the shaft 20 for rotation therewith.

Rotor 30 is of a one piece construction and is conveniently made of the same material as housing 12. The rotor includes three main portions, i.e., a somewhat elongated barrel portion 40, an annular collar portion 42 and an annular relatively short ledge portion 44 having a thickness in the radial direction somewhat less than that of the barrel portion 40. The ledge and barrel portions extend away from the collar portion in opposite axial directions as clearly shown in the drawings.

The fluid sealing action is provided by a pair of seal rings. The first of these is a stationary seal ring 46 mounted in the previously mentioned annular groove 28 in housing end wall 24. Ring 46 is preferably made of carbon to provide lasting wear. A plurality of circumferentially spaced pins 48 mounted in the bottom of groove 28 and extending a short distance into carbon ring 46 prevent rotation of the latter. A rubber gasket 49 prevents leakage between ring 46 and the seal housing. The second seal ring 50, of suitable corrosion resistant metal, is mounted on rotor 30 for rotation therewith and makes sliding contact with the seal face defined by stationary seal ring 46 all around an annular seal face 52 located in a plane at right angles to the rotation axis of shaft 20. The rotating seal ring 50 includes an axially directed portion 54 and a radially directed portion 56 thus giving a segment of such ring 50, as seen in cross-section, a generally L-shaped appearance. The seal ring 50 is actually disposed around ledge portion 44 of the rotor, the ledge having a ring 58, preferably of polytetrafluoroethylene, Teflon (Reg. TM.) tightly embracing the same. That surface of seal ring 50 facing towards said ledge has an annular groove therein within which is disposed a synthetic rubber sealing ring 60 which engages ring 58 and prevents leakage of pressurized fluids between rotor 30 and seal ring 50. An annular surface 57 which is radially inwardly located of the axially directed portion 54 forms an annular area on which fluid pressure P acts thus determining the force acting, along with centrifugal forces, to separate the seal faces defined by seal rings 46 and 50.

Seal ring 50 is keyed for rotation with rotor 30 by means of three circumferentially spaced, axially extending pins 62, one end of each being force fitted into seal ring 50 while the opposing end projects into a matching aperture 63 of slightly greater diameter than said pin formed in the collar portion 42 of the rotor. By virtue of this arrangement, seal ring 50 sealingly engages rotor 30 for rotation therewith but yet is able to move axially relative thereto.

Disposed between the collar portion 42 of the rotor and the radially extending portion 56 of the rotating seal ring is a "Belleville" spring washer 66 which is capable of urging the seal ring 50 axially away from the rotor 30 and into sealing engagement with the stationary seal ring 46. The spring washer 66 maintains a desired loading at the seal face 52 and acts to take up certain axial vibrations, small amounts of axial end play of rotor 30, and shock loads transmitted along shaft 20 which might otherwise damage the seal faces while at the same time said spring washer 66 occupies a very short axial space. The Belleville washer 66 is so arranged that the radially-inwardly located portions of same contact the rotating seal ring 50 while the radially outwardly directed portions of same contact the rotor collar portion 42 so that the regions of application of of force to the seal ring 50 by the stationary seal ring 46 on the one side, and the washer 66 on the other side are very approximately the same radial distance from the rotation axis of shaft 20. By varying the thickness as well as various other dimensions of the Belleville spring 66, the maximum force which it is capable of applying to the seal faces when compressed fully may be varied. This maximum force must be capable of resisting the previously mentioned forces acting to separate the seal faces as well as providing the desired minimum pressure loading on the relatively rotating seal faces. Thus when the seal is operating under the fluid pressure for which the seal is designed, the desired axial loading at the seal faces is obtained.

Figure 3:
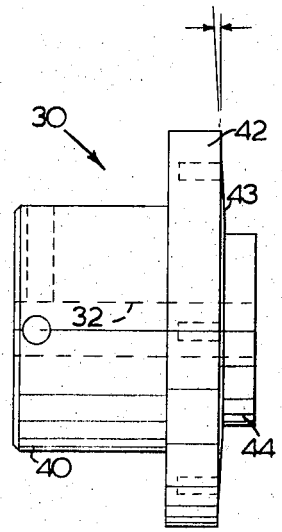
Figure 5:
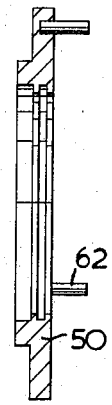
FIGS. 5 and 6 are cross sectional views of the rotary and stationary seal rings respectively.
Figure 6:
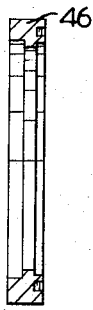
Figure 7:
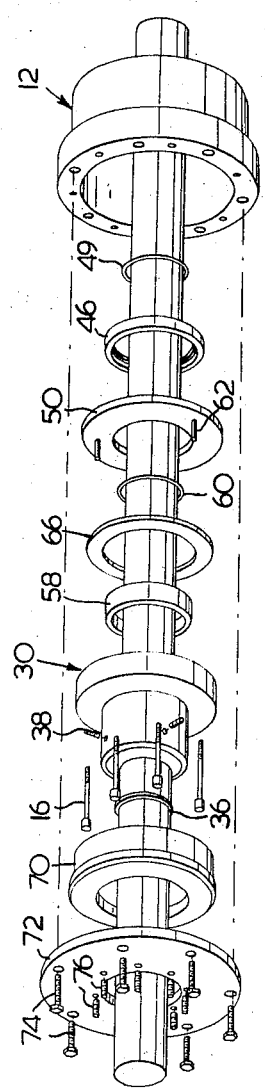
FIG. 7 is an exploded perspective view of the seal assembly according to the invention.

It will be noted in FIG. 3 that face 43 of rotor collar 42 is in the form of a shallow convex cone. Thus, when the assembly is completely tightened and spring washer 66 forced into intimate contact with face 43 of the rotor, such conical face 43 prevents the Belleville spring washer 66 from being completely flattened out and thus overstressed. It is, in fact, desirable to arrange the seal so that the Belleville spring 66 is substantially fully compressed into contact with rotor face 43 when the seal is in operation.

An axial thrust ball bearing 70 is disposed around the barrel portion 40 of rotor 30 and one side of it bears against that face of rotor collar 42 which is opposite to the face 43 over which the rotating seal ring 50 is located. The other side of the thrust bearing 70 is located adjacent the housing end closure plate 72, the latter having a central aperture therein to accommodate rotor 30 and being secured to the shoulder 26 of housing 12 by means of a plurality of studs 74 as previously mentioned. Plate 72 is provided with a plurality of circumferentially spaced axially directed adjustment screws 76, which can be tightened against the casing of thrust bearing 70. Before any substantial wear of the seal faces takes place, the seal assembly, as mentioned previously, is preferably arranged such that the Belleville spring 66 is substantially fully compressed. However, as wear of the seal faces, expecially the stationary carbon face defined by ring 46 takes place, the seal ring 50 will gradually move axially away from the rotor under the influence of Belleville spring 66. Due to the particular force versus deflection characteristics of the Belleville spring washer, no substantial change in average seal face pressure takes place at first; however, as the seal ring 50 moves away further from the rotor 30 a reduction in the force which it exerts on seal ring 50 gradually takes place until, unless adjustments are made as described hereafter, leakage may occur. Any leakage resulting from wear of the seal faces is easily corrected by tightening adjustment screws 76. By tightening these screws, the rotor 30 is shifted axially toward the stationary seal ring 46 thus compressing the Belleville spring 66 to enable placement of the desired amount of loading on the seal faces and putting an end to any leakage. Since the seal assembly 10 is externally mounted, the adjustment screws are readily accessible to permit these adjustments to be made to the seal face pressure without removing the seal assembly from the machine or dismantling it. By following the above adjustment procedure a total of 1/4 inch wear in the axial direction of the carbon seal ring 46 can be allowed before replacement of the latter is required. Another advantage of the adjustment means is that the user of the seal, by observing the degree of axial adjustment which has taken place can predict the remaining life expectancy of the seal rings and thus will be able to predict the time at which he will require replacement parts.

The thrust bearing 70 is of considerable importance in the combination as it serves to maintain a selected minimum pressure on the seal ring faces at all times, i.e., it prevents axial movement of rotor 30 away from the stationary seal ring 46; the thrust bearing 70 also serves to maintain proper axial alignment of the faces of the seal rings 46 and 50 by resisting lateral displacement of rotor 30 within the seal housing 12 and it absorbs certain shock loads and end thrusts transmitted along the shaft 20. Bearing 70 also takes up the end thrust applied to rotor 30 by the fluid pressure P acting on the rotating seal ring 50.

Those skilled in the art will realize that the present seal assembly, being of the "external" variety is arranged such that the pressurized fluid does not gain access to the working parts of the seal i.e. the rotor, thrust bearing, Belleville spring etc. thus avoiding contamination, fouling and sticking of the latter.

One basic size of seal assembly can easily be modified to suit a wide range of shaft sizes simply by varying the diameter of the bore 32 extending axially through rotor 30. The reason for this is that all of the seal devices e.g. rotating seal ring 50, Belleville spring washer 66, thrust bearing 70 are mounted on the ledge, collar and barrel portions of the rotor and their required diameters are not directly related to the shaft diameter. In other words, the diameter of the axial bore 32 in the rotor may be varied within wide limits without making any changes in the remaining seal components whatsoever. For example it has been found that a first seal size can be made to fit all shaft sizes from about one-half inch diameter to 1 5/8 inch diameter; a second seal from 1 11/16 inch to 3 inch diameters and a third seal from about 3 1/16 inch to 5 inches diameter. This means that only three basic seal sizes need be stocked for most applications. A simple change in rotor bore size is all that is requird in most cases to permit one size of seal to be used with a larger diameter shaft. This eliminates the large inventory ordinarily required to supply the many differing sizes of shaft ordinarily required to service the many differing sizes of shaft encountered in industry. This is a tremendous advantage over typical prior art seals wherein a different basic seal is required for each shaft size.

A preferred embodiment of the shaft seal has been described. For definitions of the invention reference is had to the following claims.

I claim:

1. A mechanical shaft seal comprising a housing adapted to be mounted on a machine casing such that one end thereof is exposed to fluid pressure, said housing adapted to surround a rotating shaft extending from the machine casing, said housing having a rotor mounted for rotation therein, said rotor having a bore therethrough to enable said rotor to surround and sealingly engage the shaft for rotation therewith, means defining a non-rotating seal face on said housing interior adjacent the end of the housing exposed to the fluid pressure, a seal ring mounted on said rotor and constrained in fluid sealing engagement therewith for rotation therewith, such seal ring having a seal face in sliding engagement with the non-rotating seal face, said rotor having a pair of opposed faces, spring means disposed between one rotor face and said seal ring to urge the latter axially away from the rotor and into fluid sealing engagement with the non-rotating seal face in opposition to fluid pressure forces tending to separate the seal faces, and bearing means disposed between the other rotor face and a portion of the housing to prevent axial movement of said rotor away from the non-rotating seal face under the influence of said spring means.

2. The seal according to claim 1 further including adjustment means for moving said bearing means and said rotor in the axial direction to effect there required degree of compression of the spring means to provide a proper fluid sealing effect between the seal faces.

3. The seal according to claim 2 wherein said spring comprises a Belleville spring washer and wherein said one rotor face is convexly shaped whereby to prevent said Belleville spring from being completely flattened out and thus overstressed when said rotor is moved axially by said adjustment means.

4. The seal according to claim 2 wherein said adjustment means are accessible from said housing exterior to permit the spring means to be compressed to the required degree without the need of dismantling the seal assembly.

5. A mechanical shaft seal comprising a housing adapted to be mounted on a machine casing such that one end thereof is exposed to fluid pressure, said housing adapted to surround a rotating shaft extending from the machine casing, said housing having a rotor mounted for rotation therein, said rotor having a bore therethrough to enable said rotor to surround and sealingly engage the shaft for rotation therewith, means defining a non-rotating seal face on said housing interior adjacent the end of the housing exposed to the fluid pressure, a seal ring mounted on said rotor in fluid sealing engagement therewith for rotation with the rotor, said seal ring having a seal face in sliding engagement with the non-rotating seal face, said rotor having a pair of opposed faces, spring means disposed between one rotor face and said seal ring to urge the latter axially away from the rotor and into fluid sealing engagement with the non-rotating seal face in opposition to fluid pressure forces tending to separate the seal faces, said rotor having an annular ledge portion extending axially away from said one rotor face, said seal ring being mounted on said annular ledge in sealing engagement therewith for axial movement therealong, and axially extending pin means extending between said seal ring and said rotor to cause the seal ring to rotate with the rotor while permitting relative axial movement therebetween.

6. The seal according to claim 5 wherein said spring comprises a Belleville washer, and means to prevent the Belleville washer from being completely flattened out and thus overstressed.

7. A mechanical shaft seal comprising a housing adapted to be mounted on a machine casing such that one end thereof is exposed to fluid pressure, said housing adapted to surround a rotating shaft extending from the machine casing, said housing having a rotor mounted for rotation therein, said rotor having a bore therethrough to enable said rotor to surround and sealingly engage the shaft for rotation therewith, means defining a non-rotating seal face on said housing interior adjacent the end of the housing exposed to the fluid pressure, a seal ring mounted on said rotor for limited axial movement therealong in fluid sealing engagement therewith for rotation with the rotor, such seal ring having a seal face in sliding engagement with the non-rotating seal face, said rotor having a pair of opposed faces, spring means disposed between one rotor face and said seal ring to urge the latter axially away from the rotor and into fluid sealing engagement with the non-rotating seal face in opposition to fluid pressure forces tending to separate the seal faces, and axially extending circumferentially spaced pin means extending between said seal ring and said rotor to cause the seal ring to rotate with the rotor while permitting relative axial movement therebetween.

8. The seal according to claim 7 wherein said spring comprises a Belleville washer, and means to prevent the washer from being completely flattened out and thus overstressed.

9. The seal according to claim 7 including adjustment means accessible from the exterior of the housing for positioning the rotor at an axial position such as to provide the desired degree of compression of said spring and hence the desired degree of pressure between said sealing faces.

10. A mechanical shaft seal comprising a housing adapted to be mounted on a machine casing such that one end thereof is exposed to fluid pressure, said housing adapted to surround a rotating shaft extending from the machine casing, said housing having a rotor mounted for rotation therein, said rotor having a bore therethrough to enable said rotor to surround and sealingly engage the shaft for rotation therewith, means defining a non-rotating seal face on said housing interior adjacent the end of the housing exposed to the fluid pressure, a seal ring mounted on said rotor in fluid sealing engagement therewith for rotation with the rotor, said seal ring having a seal face in sliding engagement with the non-rotating seal face, said rotor having a pair of opposed faces, compression spring means disposed between one rotor face and said seal ring to urge the latter axially away from the rotor and into fluid sealing engagement with the non-rotating seal face in opposition to fluid pressure forces tending to separate the seal faces, said rotor having an annular ledge portion extending axially away from said one rotor face, said seal ring being mounted on said annular ledge in sealing engagement therewith for axial movement therealong, and means arranged between said seal ring and said rotor to cause the seal ring to rotate with the rotor while permitting relative axial movement therebetween.

11. The seal according to claim 10 wherein said spring comprises a Belleville washer, and means to prevent the Belleville washer from being completely flattened out and thus overstressed.

12. A mechanical seal according to claim 10 further including bearing means interposed between said housing and said rotor to prevent movement of the rotor away from said non-rotating seal face whereby to assist in maintaining the seal faces in said sealing engagement.

13. The seal according to claim 12 including adjustment means associated with said bearing means for shifting same together with said rotor in the axial direction to compress the spring means and provide the desired degree of pressure between said seal faces.

14. The seal according to claim 12 wherein said rotor further includes a collar portion, said rotor also having a barrel portion, said barrel portion and said ledge portion extending in opposite directions from the collar portion, said bearing means comprising a thrust bearing surrounding said barrel means and disposed between an end wall of the housing and one side of said collar portion.

15. The seal according to claim 14 wherein the means to cause rotation of the rotor with the seal ring comprises axially extending circumferentially spaced pin means extending from the seal ring into said rotor to transmit rotary motion of the latter to the seal ring.

16. The seal according to claim 15 including adjustment means for positioning said thrust bearing and said rotor at an axial position such as to provide the desired degree of compression of said spring means and hence the desired degree of pressure between said sealing faces.

17. The seal according to claim 15 wherein said rotor has a bore extending axially therethrough and having a diameter chosen in accordance with the diameter of the shaft.

* * * * *